US005156044A

United States Patent [19]

Benninger et al.

[11] Patent Number: 5,156,044

[45] Date of Patent: Oct. 20, 1992

[54] ARRANGEMENT FOR SWITCHING IN AN EXHAUST-GAS PROBE HEATER

[75] Inventors: Nikolaus Benninger, Vaihingen/Enz; Günther Plapp, Filderstadt, both of Fed. Rep. of Germany

[73] Assignee: Robert Bosch GmbH, Stuttgart, Fed. Rep. of Germany

[21] Appl. No.: 715,581

[22] Filed: Jun. 14, 1991

[30] Foreign Application Priority Data

Jun. 15, 1990 [DE] Fed. Rep. of Germany ....... 4019067

[51] Int. Cl.[5] .......... G01M 19/00

[52] U.S. Cl. .......... 73/117.2

[58] Field of Search .......... 73/117.2, 117.3, 118.1, 73/118.2, 23.31, 23.32; 123/440; 340/457.1

[56] References Cited

U.S. PATENT DOCUMENTS 4,033,170 7/1977 Kawamura et al. .......... 73/23.31
4,236,141 11/1980 Terabayashi et al. .......... 340/457.1
4,611,562 9/1986 Nakano et al. .......... 123/440

*Primary Examiner*—Jerry W. Myracle
*Attorney, Agent, or Firm*—Walter Ottesen

[57] ABSTRACT

The invention is directed to an arrangement for advancing the point in time at which the mixture control is placed into operation when starting an internal combustion engine. This advance is made possible in that the exhaust-gas probe heater is already switched on in advance of the start of the engine. Operations are utilized for triggering the required switching signal which occur when the vehicle is taken into service such as opening the doors of the vehicle. An unnecessary heating of the exhaust-gas probe is precluded by limiting the time duration of the heating pulse applied to the heater.

7 Claims, 1 Drawing Sheet

ARRANGEMENT FOR SWITCHING IN AN EXHAUST-GAS PROBE HEATER

FIELD OF THE INVENTION

The invention relates to an arrangement for the open-loop and closed-loop control of a heater such as the heater of a probe mounted in the exhaust gas of an internal combustion engine.

BACKGROUND OF THE INVENTION

The invention proceeds from a method and an arrangement for controlling the heater of an exhaust-gas probe in the exhaust gas of an internal combustion engine. The mixture control of an internal combustion engine which is necessary with respect to optimal consumption, exhaust-gas minimization and catalytic converter protection is only possible when the exhaust-gas probe is adequately heated for technical and physical reasons as known from U.S. Pat. No. 4,357,922. For this reason, the mixture closed-loop control in the warm-up phase is usually replaced by a mixture open-loop control.

U.S. Pat. No. 4,291,572 discloses an exhaust-gas probe heater with which the rapid operational readiness of the exhaust-gas probe is obtained after start as well as for maintaining operational readiness under all operating conditions. This exhaust-gas probe heater is controlled in dependence upon the load condition of the engine. An alternative to this heater is disclosed in U.S. Pat. No. 4,170,967 wherein an exhaust-gas probe heater control is described which operates in dependence upon the function signal of the exhaust-gas probe. A common disadvantage of the known solutions is that the exhaust-gas probe is not operationally ready when the engine is started.

SUMMARY OF THE INVENTION

It is an object of the invention to provide an arrangement wherein the time duration between the start of the engine and the operational readiness of the exhaust-gas probe is shortened. The operating-start time point of the mixture closed-loop control advanced forward thereby affords advantages with respect to consumption optimization, emission reduction and catalytic converter service life.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
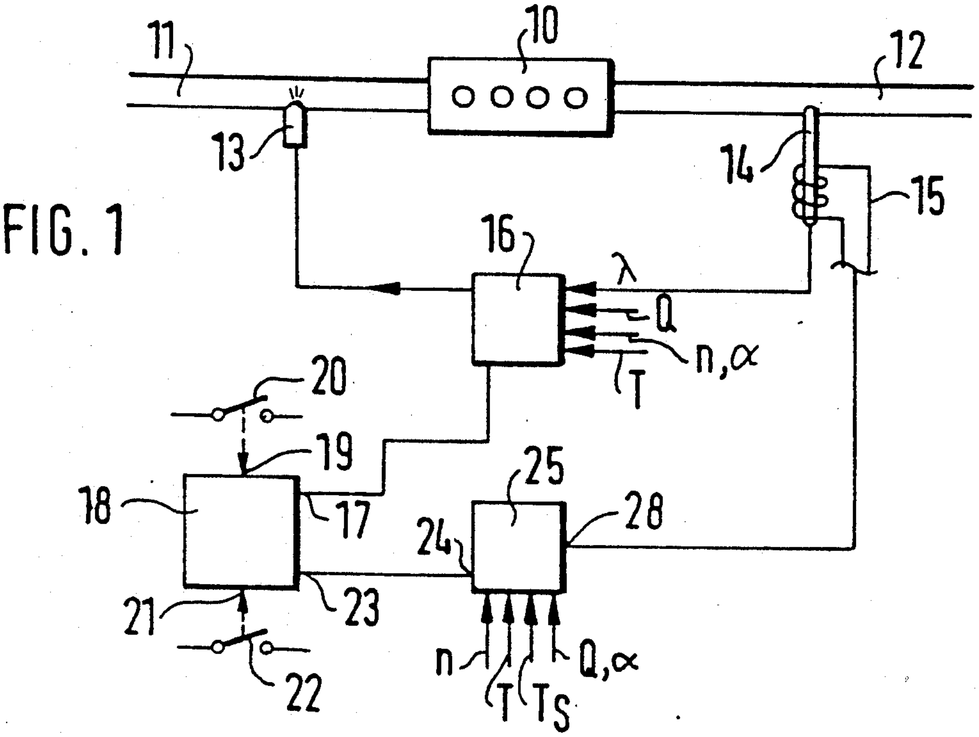
FIG. 1 is a function schematic of a closed-loop control loop for controlling the mixture of an internal combustion engine which is expanded to include an exhaust-gas probe heater.

FIG. 1 shows an internal combustion engine 10 having an intake pipe 11 and an exhaust pipe 12. A fuel-metering unit is mounted in the intake pipe. The exhaust-gas pipe 12 contains an exhaust-gas probe 14 provided with a heating device 15. Reference numeral 16 identifies a mixture-control unit. The mixture-control unit has an output at which a signal is present for the fuel-metering unit and an input for the signal of the exhaust-gas probe. In addition, the mixture-control unit includes additional inputs for engine speed (n), temperature (T) and load-dependent parameters such as the air throughput (Q) or throttle flap angle $\alpha$. A further input of the mixture-control unit 16 is connected to an output 17 of a start block 18. Block 18 can be acted upon by an ignition switch 20 via an input 19 as well as by a switch 22 provided by the invention via an input 21. A further output 23 of the start block 18 is connected to an input 24 of the heating block 25. In addition to the output 28 for the heating device 15 of the exhaust-gas probe 14, block 25 can be provided with still further inputs for engine speed, exhaust-gas temperature, exhaust-gas probe temperature, engine temperature, air throughput and throttle flap angle. The mixture-control unit 16 and heating block 25 are shown separate from each other in the drawing for the purpose of clarity; however, they can be combined in the same unit.

Except for the configuration of the start block 18, the functional schematic shown in FIG. 1 corresponds to the state of the art. The engine is supplied with a combustible fuel/air mixture with the aid of the fuel-metering unit mounted in the intake pipe 11. The residual oxygen content of the exhaust gas which occurs during combustion is detected by the exhaust-gas probe 14 and supplied to the mixture control unit 16. This control unit determines the fuel metering for the next work cycles in dependence upon its input variables. In the time duration which passes after the start of the engine up to the operational readiness of the probe, the closed-loop control is conventionally substituted with a mixture open-loop control. The heating device 15 is controlled by the heating block 25 to maintain the operating temperature of the exhaust-gas probe 14 during changing operating conditions.

Figure 2:
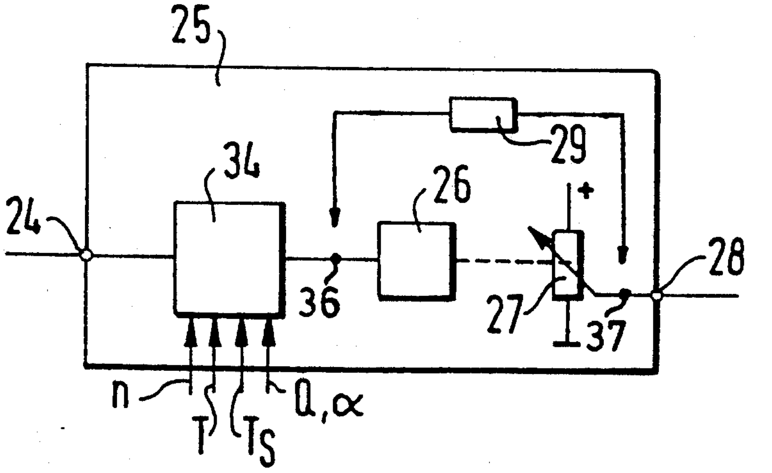
FIG. 2 shows one embodiment of the heating and start function blocks of the arrangement according to the invention; and, FIG. 3 is another embodiment of the heating and start function blocks of the arrangement according to the invention.

The configuration of the heating block 25 is shown in FIG. 2. The terminal 24 of this block and the terminals for the operating parameters such as engine speed and the like are connected to corresponding inputs of the heating control unit 34. The output of unit 34 is connected via an actuator 26 and a controllable resistor 27 to the output 28 of the heating block. Block 29 represents an alternative to the components 26 and 27 and can be connected between circuit node 36 and 37 in lieu of the components 26 and 27. The block 29 is intended to provide heater power control via a variable pulse duty factor.

A control signal is formed in the heating control unit 34 in dependence upon the input parameters. The control signal determines the power in the control loop of the heating unit 15 for the exhaust-gas probe 14 in advance of and during operation of the engine. The last condition can be necessary when, for example, the energy of the exhaust gas is not sufficient to maintain the exhaust-gas probe 14 at the operating temperature such as during idle.

Figure 3:
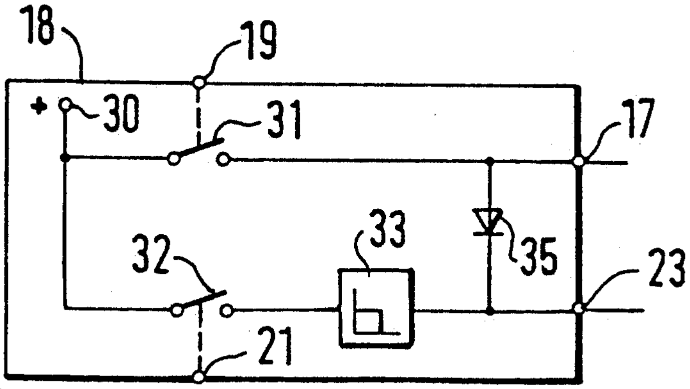

FIG. 3 shows an embodiment of the start block 18 of the arrangement according to the invention. A positive terminal 30 is connected to two switches 31 and 32. The switch 31 is connected to the input 19 of the start block and is actuated by the ignition switch 20. The switch 31 opens or closes the connection between the positive pole 30 and the output 17 of the start block in dependence upon the switching position. The switch 32 is connected to the input 21 of the start block and is actuated by the switch 22. When closed, this switch 32 connects the positive pole 30 via a time component 33 to the output 23 of the start block. A blocking diode 35 is disposed between the outputs 17 and 23 and permits a current flow from 17 to 23 while the reverse direction is blocked.

What is essential is that the heating unit 15 of the exhaust-gas probe 14 is switched on by an operation lying ahead in time of the start of the engine by means of the configuration of the start block 18 according to the applicants' invention. This takes place by the actuation of switch 22 which can be in the form of a door lock contact and is closed when the motor vehicle is opened by the driver.

Further embodiments of the invention are provided when the function of the switch 22 is realized by means of a contact arranged below the driver's seat which responds to the load on the seat. On the other hand, this function can be accomplished by coupling to the switch-on of the interior lighting of the vehicle when opening the door. In this way, the heating control unit 15 is supplied with current in advance of the actuation of the ignition switch 20. In this case, the blocking diode blocks the current flow between the two outputs and prevents the switching in of other components which are intended only to operate when the ignition switch is closed.

In order to preclude an unneeded heating of the exhaust-gas probe without operation of the engine, the pulse switched on in this manner is limited in its duration in that a time component 33 interrupts the current supply of the heating device after an appropriate time duration with the time component being configured, for example, as a monostable flip-flop. During operation of the engine, this current supply is maintained via the ignition current loop and the blocking diode non-blocking in this direction.

It is understood that the foregoing description is that of the preferred embodiments of the invention and that various changes and modifications may be made thereto without departing from the spirit and scope of the invention as defined in the appended claims.

What is claimed is:

1. An arrangement for controlling a heater of a probe in the exhaust gas of an internal combustion engine of a motor vehicle having an ignition switch for starting the engine and taking the motor vehicle into service, the arrangement comprising:

circuit means for supplying an output to the heater; and, switching means connected to said circuit means for emitting a switch-on signal to trigger said circuit means to supply said output in advance of the actuation of the ignition switch for taking the motor vehicle into service.

2. The arrangement of claim 1, the engine being mounted in a motor vehicle having a door, said switching means including a switch for initiating said switch-on signal; and, said switch being mounted on the door so as to be actuated when a driver opens the door to enter the vehicle.

3. The arrangement of claim 1, the engine being mounted in a motor vehicle having a driver's seat; said switching means including a switch for initiating said switch-on signal; and, said switch being mounted in the seat so as to be actuated in response to the weight of a driver.

4. The arrangement of claim 1, the engine being mounted in a motor vehicle having a door and interior lighting actuated by a switch when the door is opened; said switching means including said switch for emitting said switch-on signal when the door is opened.

5. The arrangement of claim 1, said circuit means including a time component for limiting the time during which said output is applied to the heater.

6. An arrangement for controlling a heater of a probe in the exhaust gas of an internal combustion engine actuated by an ignition switch, the arrangement comprising:

circuit means for supplying an output to the heater;

switching means connected to said circuit means for emitting a switch-on signal to trigger said circuit means to supply said output in advance of the actuation of the ignition switch; and, ancillary circuit means operatively connected to said ignition switch for rendering said time component ineffective after the ignition switch is switched on.

7. An arrangement for controlling a heater of a probe in the exhaust gas of an internal combustion engine of a motor vehicle having an ignition switch for starting the engine and taking the motor vehicle into service, the arrangement comprising:

circuit means for supplying an output to the heater;

switching means connected to said circuit means for emitting a switch-on signal to trigger said circuit means to supply said output in advance of the actuation of the ignition switch when the motor vehicle is taken into service; and, said switching means being mounted and located on said vehicle so as to be actuated by the operator before the operator can actuate said ignition switch.

* * * * *